United States Patent
Frank et al.

(10) Patent No.: US 10,387,309 B2
(45) Date of Patent: Aug. 20, 2019

(54) HIGH-PERFORMANCE DISTRIBUTED CACHING

(71) Applicant: Elastifile Ltd., Herzliya (IL)

(72) Inventors: Shahar Frank, Ramat Hasharon (IL); Ezra Hoch, Tel Aviv (IL); Shai Koffman, Hod Hasharon (IL); Allon Cohen, Los Altos, CA (US); Avraham Meir, Rishon LeZion (IL)

(73) Assignee: Elastifile Ltd., Herzliya (IL)

( * ) Notice: Subject to any disclaimer, the term of this patent is extended or adjusted under 35 U.S.C. 154(b) by 294 days.

(21) Appl. No.: 15/213,426

(22) Filed: Jul. 19, 2016

(65) Prior Publication Data

US 2017/0109282 A1  Apr. 20, 2017

Related U.S. Application Data

(60) Provisional application No. 62/241,225, filed on Oct. 14, 2015.

(51) Int. Cl.
| G06F 12/00 | (2006.01) |
| G06F 12/0813 | (2016.01) |
| G06F 12/0842 | (2016.01) |
| G06F 12/0815 | (2016.01) |
| G06F 12/0817 | (2016.01) |

(52) U.S. Cl.
CPC ...... *G06F 12/0813* (2013.01); *G06F 12/0815* (2013.01); *G06F 12/0842* (2013.01); *G06F 12/0817* (2013.01); *G06F 2212/1016* (2013.01); *G06F 2212/152* (2013.01); *G06F 2212/154* (2013.01); *G06F 2212/502* (2013.01); *G06F 2212/6042* (2013.01)

(58) Field of Classification Search
CPC ............. G06F 12/0813; G06F 12/0815; G06F 12/0842; G06F 12/0817; G06F 2212/1016; G06F 2212/152; G06F 2212/154; G06F 2212/502; G06F 2212/6042
USPC ........................................................ 711/118
See application file for complete search history.

(56) References Cited

U.S. PATENT DOCUMENTS

| 7,386,662 B1 | 6/2008 | Kekre et al. |
| 8,943,271 B2 | 1/2015 | Krishnaprasad et al. |
| 2015/0312366 A1 | 10/2015 | Ben-Yehuda |

FOREIGN PATENT DOCUMENTS

WO  2001038983 A2  5/2001

*Primary Examiner* — Matthew Bradley
(74) *Attorney, Agent, or Firm* — Kligler & Associates

(57) ABSTRACT

A computing system includes multiple compute nodes that include respective processors and respective cache memories. The processors are configured to determine a default compute node in which a given data item is to be cached, to make a decision whether to cache the given data item in the default compute node or in an alternative compute node, based on cache-quality metrics that are evaluated for respective cache memories of the compute nodes, and to cache the given data item in the default compute node or in the alternative compute node, depending on the decision.

20 Claims, 2 Drawing Sheets

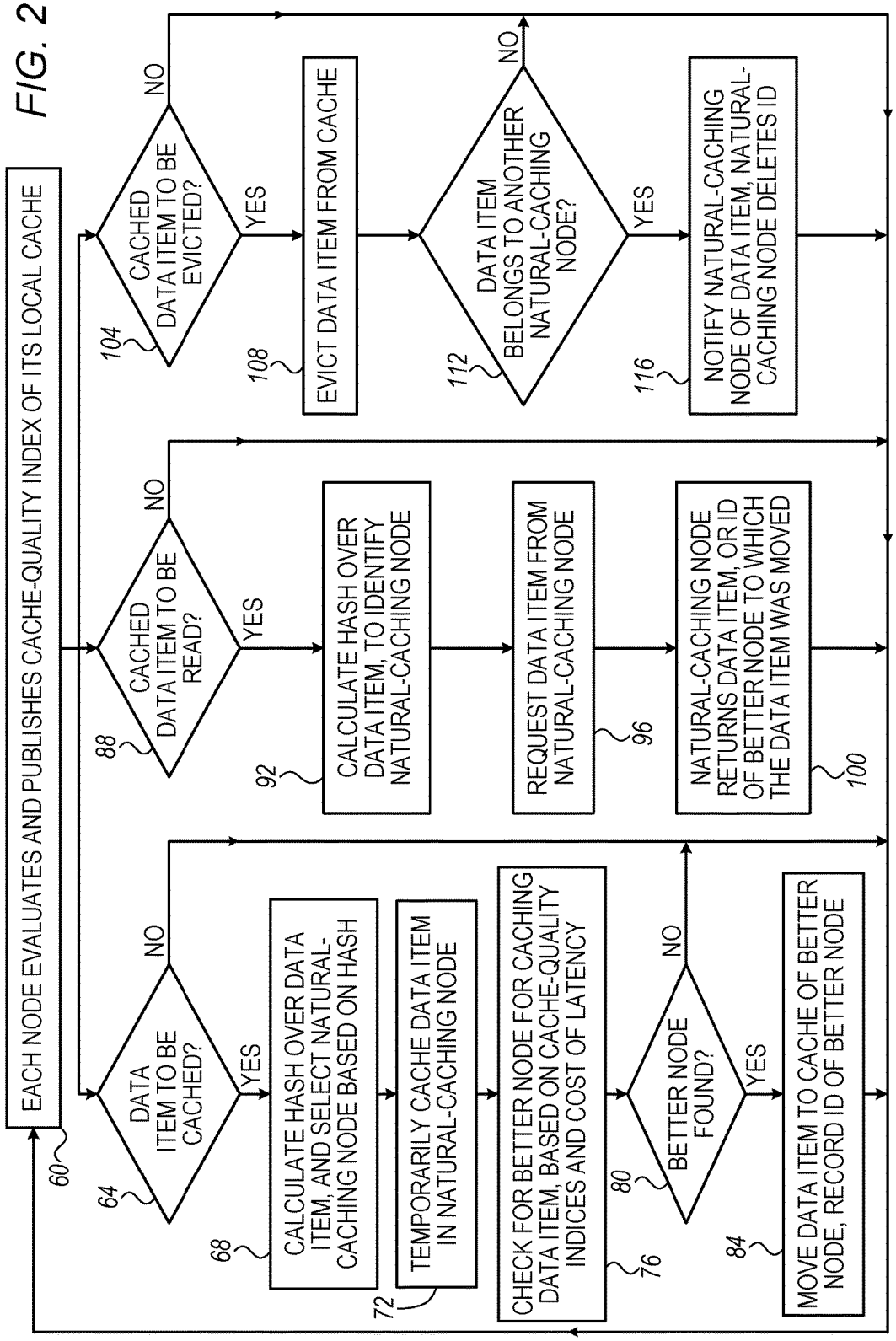

HIGH-PERFORMANCE DISTRIBUTED CACHING

CROSS-REFERENCE TO RELATED APPLICATIONS

This application claims the benefit of U.S. Provisional Patent Application 62/241,225, filed Oct. 14, 2015, whose disclosure is incorporated herein by reference.

FIELD OF THE INVENTION

The present invention relates generally to data storage, and particularly to methods and systems for distributed caching.

BACKGROUND OF THE INVENTION

Computing systems that store data in persistent storage devices often cache data and metadata in memory in order to improve performance. Some caching schemes are distributed. For example, U.S. Pat. No. 8,943,271, whose disclosure is incorporated herein by reference, describes systems and methods that aggregate memory capacity of multiple computers into a single unified cache, via a layering arrangement.

U.S. Patent Application Publication 2015/0312366, whose disclosure is incorporated herein by reference, describes a method including, in a plurality of compute nodes that communicate with one another over a communication network, running one or more Virtual Machines (VMs) that access storage blocks stored on non-volatile storage devices coupled to at least some of the compute nodes. One or more of the storage blocks accessed by a given VM, which runs on a first compute node, are cached in a volatile memory of a second compute node that is different from the first compute node. The cached storage blocks are served to the given VM.

U.S. Pat. No. 7,386,662, whose disclosure is incorporated herein by reference, describes systems and methods for performing cache and I/O management in a multi-layer storage virtualization environment. Block virtualization may be implemented at various layers, each with one or more storage entities. One storage entity may coordinate and leverage the cache and the caching mechanism available with another storage entity. The storage entities may be at the same layer (horizontal cache coordination) or at different layers (vertical cache coordination). Cache coordination may include application-assisted read-ahead.

PCT International Publication WO 2001/038983, whose disclosure is incorporated herein by reference, describes a process for managing a distributed cache that stores cache information at a plurality of participating nodes of a network. The distributed cache includes a plurality of cache entries each having an associated portion of the cache information, each of the participating nodes including an associated local memory storage system for storing information including a local cache database for storing locally owned ones of the cache entries.

SUMMARY OF THE INVENTION

An embodiment of the present invention that is described herein provides a computing system, which includes multiple compute nodes that include respective processors and respective cache memories. The processors are configured to determine a default compute node in which a given data item is to be cached, to make a decision whether to cache the given data item in the default compute node or in an alternative compute node, based on cache-quality metrics that are evaluated for respective cache memories of the compute nodes, and to cache the given data item in the default compute node or in the alternative compute node, depending on the decision.

In some embodiments, the processors are configured to make the decision by evaluating a criterion that depends on (i) the cache-quality metrics and (ii) one or more estimated latencies incurred by caching the given data item in one or more respective compute nodes.

Additionally or alternatively, the processors are configured to make the decision by evaluating a criterion that depends on a topology of a network that interconnects the compute nodes. Further additionally or alternatively, the processors are configured to make the decision by evaluating a criterion that depends on an importance measure of the given data item.

In various embodiments, a cache-quality metric of a cache memory of a compute node depends on one or more of: respective ages of one or more data items cached in the cache memory, respective importance levels of one or more data items cached in the cache memory, respective frequencies with which one or more cached data items are accessed, respective weighted costs of eviction for one or more data items most-recently evicted from the cache memory, respective quality levels of the one or more data items most-recently evicted from the cache memory, respective weighted eviction costs for one or more lowest-quality data items evicted from the cache memory, a total size of the cache memory, a size of remaining free memory in the cache memory, and an extent to which the compute node is busy.

In some embodiments, when the decision is to cache the given data item in the alternative compute node, a processor of the default compute node is configured to record an identity of the alternative compute node. In an example embodiment, a processor of a compute node is configured to read the given data item by requesting the given data item from the default compute node, and in response receiving either the given data item or the identity of the alternative compute node in which the given data item is actually cached. In another embodiment, in response to eviction of the given data item from the cache memory of the alternative compute node, a processor of the default compute node is configured to delete the identifier of the alternative compute node. In a disclosed embodiment, the processors are configured to initially cache the given data item in the default compute node, and, if the decision is to cache the given data item in the alternative compute node, to send the given data item to the alternative compute node.

There is additionally provided, in accordance with an embodiment of the present invention, a method for data storage including, in a computing system that includes multiple compute nodes, determining a default compute node in which a given data item is to be cached. A decision is made whether to cache the given data item in the default compute node or in an alternative compute node, based on cache-quality metrics that are evaluated for respective cache memories of the compute nodes. The given data item is cached in the default compute node or in the alternative compute node, depending on the decision.

There is further provided, in accordance with an embodiment of the present invention, a compute node including a network interface and a processor. The network interface is configured for communicating over a network with one or more other compute node. The processor is configured to determine a default compute node in which a given data item is to be cached, to make a decision whether to cache the given data item in the default compute node or in an alternative compute node, based on cache-quality metrics that are evaluated for respective cache memories of the compute nodes, and to cache the given data item in the default compute node or in the alternative compute node, depending on the decision.

There is also provided, in accordance with an embodiment of the present invention, a computer software product, the product including a tangible non-transitory computer-readable medium in which program instructions are stored, which instructions, when read by a processor of a compute node that is connected by a network to one or more other compute nodes, causes the processor to determine a default compute node in which a given data item is to be cached, to make a decision whether to cache the given data item in the default compute node or in an alternative compute node, based on cache-quality metrics that are evaluated for respective cache memories of the compute nodes, and to cache the given data item in the default compute node or in the alternative compute node, depending on the decision.

The present invention will be more fully understood from the following detailed description of the embodiments thereof, taken together with the drawings in which:

BRIEF DESCRIPTION OF THE DRAWINGS

FIG. 2 is a flow chart that schematically illustrates a method for distributed caching, in accordance with an embodiment of the present invention.

DETAILED DESCRIPTION OF EMBODIMENTS

Overview

Figure 1:
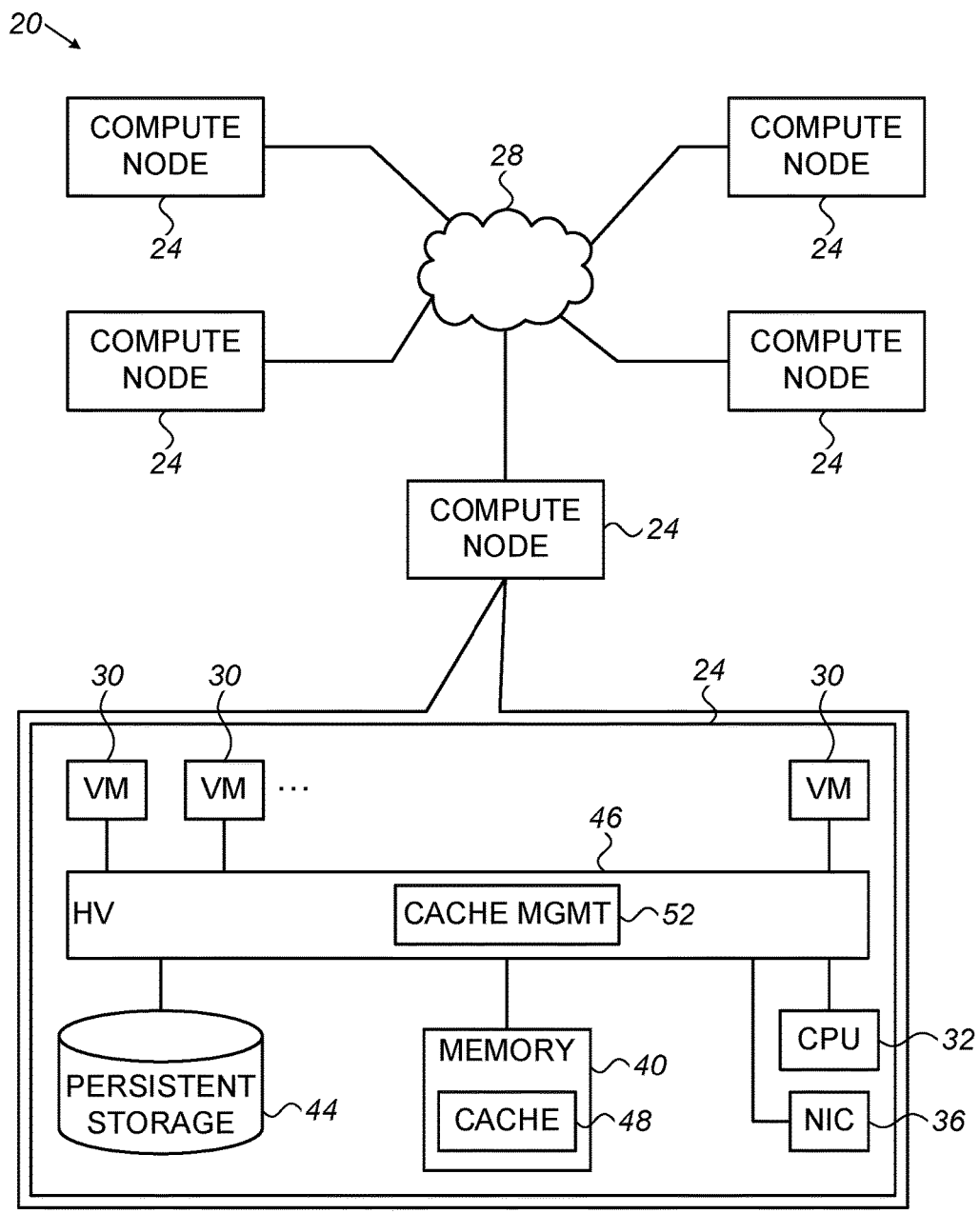
FIG. 1 is a block diagram that schematically illustrates a computing system, in accordance with an embodiment of the present invention.

Embodiments of the present invention that are described herein provide improved methods and systems for distributed caching in computing systems. In some embodiments, a computing system comprises multiple compute nodes that communicate over a network. Each compute node comprises a memory, and at least some of the compute nodes comprise persistent storage devices. In each compute node, part of the memory is used as a cache memory, in order to improve storage performance.

In some embodiments, each compute node runs a cache-management module. Each cache-management module manages the local cache memory of the compute node, and communicates over the network with peer cache-management module on the other compute nodes. Jointly, the cache-management modules utilize the cache memories of the various compute nodes as a distributed caching resource that serves the entire computing system.

Typically, for each data item, the cache-management modules determine a "natural-caching node"—a compute node in which the data item is to be cached by default. For example, a cache-management module may identify the natural-caching node by hashing the address of the data item, or other suitable attribute associated with the data item.

In practice, however, the natural-caching node of a data item is not always the optimal node for caching the data item. There may exist an alternative node that is more suitable in terms of performance and/or resource utilization. For example, an alternative node may have more free space in its cache memory than the natural-caching node. Additionally or alternatively, the cache memory of the natural-caching node may contain important or latency-sensitive data items, whereas the cache memory of an alternative node may contain less important or latency-insensitive data items.

Thus, in some embodiments the cache-management modules decide whether to cache data items in their natural-caching nodes or in alternative nodes. For this purpose, each cache-management module continually evaluates a cache-quality index for its local cache memory, and publishes this index across the computing system. A cache having a high cache-quality index is regarded as attractive or preferable for caching additional data items, and vice versa.

When preparing to cache a given data item, a cache-management module uses the published cache-quality indices for deciding whether to cache the data item in the natural-caching node or is some alternative node. The decision may also depend on additional factors, such as the additional latency incurred by caching the data item in the alternative node.

By using the disclosed techniques, the cache-management modules are able to utilize the cache memories across the computing system efficiently. As such, storage performance in the computing system can be improved considerably. Additional cache-management mechanisms, such as retrieval of cached data items, eviction of cached data items and load balancing among the cache memories of the nodes, are also described.

System Description

FIG. 1 is a block diagram that schematically illustrates a computing system 20, in accordance with an embodiment of the present invention. System 20 may comprise, for example, a data center, a cloud computing system, a High-Performance Computing (HPC) system, or a computing system that performs any other suitable function.

System 20 comprises multiple compute nodes 24 that communicate with one another over a computer communication network 28. Compute nodes 24 are referred to herein as nodes, for brevity, and may comprise, for example, servers, workstations or any other suitable type of compute node. Nodes 24 may communicate over network 28 in accordance with any suitable network communication protocol, such as Ethernet or Infiniband. System 20 may comprise any suitable number of compute nodes. Nodes 24 may be collocated or located in multiple geographical locations. The collection of nodes 24 is also sometimes referred to as a cluster.

An inset at the bottom of the figure shows the internal structure of one of nodes 24, in an embodiment. The other nodes in system 20 typically have a similar structure, although some differences may exist. In the present example, each node 24 runs workloads, such as Virtual Machines (VMs) 30, which in turn run client applications. A given node 24 may run any suitable number of workloads, and some nodes may not run workloads at all. The description that follows refers mainly to virtualized environments in which the workloads comprise VMs. Alternatively, however, the disclosed techniques can be used with various other suitable types of workloads, such as OS containers, processes, or user applications, in either virtualized or non-virtualized environments.

In the present example, each node runs a hypervisor 46, a virtualization layer that mediates between VMs 30 (or other workloads) and physical resources of the node, and allocates such physical resources to the VMs. Hypervisor 52 may comprise, for example, VMWare ESXi, Microsoft Hyper-V, Citrix Xen, RedHat KVM, OpenStack, or any other suitable hypervisor.

In the example of FIG. 1, the physical resources in node 24 comprise one or more Central Processing Units (CPU) 32, one or more network interfaces such as Network Interface Controllers (NICs) 36, volatile memory 40 such as Random Access Memory (RAM), and one or more persistent storage devices 44, such as Hard Disk Drives (HDD) or Solid State Drives (SSD). Hypervisor 46 runs on CPU 32 and allocates the various physical resources to VMs 30 as needed.

Generally, not every node necessarily comprises all types of physical resources. For example, some nodes may not comprise persistent storage devices. Moreover, a given VM may utilize physical resources that do not necessarily reside locally on the node on which the VM runs.

In some embodiments, part of memory 40 is used as a cache memory 48 (referred to herein simply as "cache" for brevity). Cache 48 is used for temporary storage of data items that were read from storage devices 44, and/or data items that were, or about to be, sent for storage on storage devices 44. Data items may comprise, for example, memory pages containing user or application data, files or parts thereof containing user or application data, system storage management metadata, local storage management metadata, or any other suitable type of data items.

As will be explained below, cache memories 48 of the various nodes 24 are managed collectively as a distributed caching resource that serves the entire system 20. In some embodiments, each hypervisor 46 comprises a cache-management module 52, which manages cache memory 48 of that node, and communicates over network 28 with peer cache-management modules 52 of other nodes. Cache-management module 52, being a component of hypervisor 46, is typically implemented as a software module that runs on CPU 32.

The configurations of system 20 and nodes 24 shown in FIG. 1 are example configurations, which are chosen purely for the sake of conceptual clarity. In alternative embodiments, the disclosed techniques can be implemented with any other suitable system and/or node configuration. The different elements of node 24 may be implemented using suitable hardware, using software, or using a combination of hardware and software elements.

In some embodiments, CPUs 32 (which run hypervisors 46 including cache-management modules 52) comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Distributed Caching Methods

In some embodiments, cache-management modules 52 of nodes 24 manage caches 48 jointly, so as to cache data items efficiently. Thus, for example, a data item that is produced in a given node need not necessarily be cached in the same node. The decision as to where to cache a given data item may consider, for example, the status of cache memories 28 of the various nodes 24, the latencies that are expected to be incurred when sending the data item for caching on various possible remote nodes 24, and/or the topology of network 28.

Additionally or alternatively, the decision may consider the importance of the data item. The importance can be expressed or assessed, for example, by the frequency with which the data item is accessed or using some other suitable measure. For example, a less important (e.g., rarely accessed) data item may not necessarily be cached in the best possible node. Further additionally or alternatively, the decision as to where to cache a given data item may depend on any other suitable factors.

In some embodiments, modules 52 use a predefined mapping that maps any data item to a "natural-caching node" on which the data item is to be cached by default. The natural-caching node is also referred to herein as the default node of the data item. For example, a module 52 may determine the natural-caching node by calculating a hash function over some attribute of the data item, e.g., over the storage address of the data item, or over some or all of the content of the data item. The output of the hash function is used as an index of the natural-caching node. As can be appreciated, the natural-caching node is not necessarily (and often is not) the node in which the data item is produced.

In practice, however, the natural-caching node of a data item is not always the optimal node for caching the data item in terms of performance. In other words, there may exist an alternative node that is more suitable for caching the data item.

For example, an alternative node may have more free space in its cache 48 than the natural-caching node. As another example, the cache of the natural-caching node may contain a large number of important or latency-sensitive data items, whereas the cache of an alternative node may contain less important or latency-insensitive data items. As long as the performance penalty (e.g., added latency) incurred by caching the data item in the alternative node is tolerable, it may be beneficial to cache the data item in the alternative node rather than in the natural-caching node.

Thus, in some embodiments modules 52 continually communicate with one another in order to (i) update one another as to the status of their cache memories, (ii) make decisions whether to cache data items in their natural-caching nodes or in alternative nodes, and (iii) cache and retrieve data items in accordance with these decisions.

FIG. 2 is a flow chart that schematically illustrates a method for distributed caching, carried out by cache-management modules 52 of nodes 24, in accordance with an embodiment of the present invention. The method begins with each cache-management module 52 evaluating a cache-quality index for its local cache 48, at a cache quality evaluation step 60. Each cache-management module 52 publishes its cache-quality index over network 28 to the other cache-management modules.

The cache-quality indices are also referred to herein as cache-quality metrics. The cache-quality index of a given cache memory 48 (in a given node 24) typically comprises one or more numerical measures that quantify the attractiveness of a given cache memory 48 for caching additional data items. In some embodiments the cache-quality index of a given cache memory consists of a single numerical value. In other embodiments, the cache-quality index may comprise multiple values, e.g., a histogram of the currently cached items. A cache memory characterized by a high cache-quality index is regarded as attractive or preferable for caching additional data items, and vice versa.

Cache-management module 52 may evaluate the cache-quality index in various ways and based on various properties of the cached data items, and/or of the cache memory itself. In an example embodiment, module 52 evaluates the age of each data item cached in cache 52, i.e., the time that elapsed since the data item was most recently accessed until the current time. Module 52 calculates the average age, among the cached data items, and uses this average as the cache-quality index.

In some embodiments, when calculating the average age, module 52 may apply weights to the ages of the data items. The weight applied to the age of a data item may depend, for example, on the size of the data item, on an importance level attributed to the data item, or on any other suitable property of the data item.

In one embodiment, the level of importance of a data item is set by a user policy, based on the file to which the data item belongs. Such a policy may set the importance level of a file depending on, for example, the file type, file size, specific files or groups of files, or any other suitable parameter.

Additionally or alternatively, module 52 may calculate the cache-quality index depending on one or more of the following properties of the cached data items:

Respective frequencies with which one or more of the cached data items are accessed. A cache memory that holds rarely-accessed data items will typically receive a high cache-quality index, since the penalty of evicting existing data items in place of new data items is small.

Respective weighted "eviction costs," i.e., the performance penalties which were incurred by evicting the N data items that were most-recently evicted from the cache memory. N is a system configurable parameter. A small eviction cost will typically increase the cache-quality index, and vice versa.

Respective quality levels of the N most-recently evicted data items. Recently evicted high-quality data items will typically reduce the cache-quality index, and vice versa.

Respective weighted eviction costs for the M lowest-quality data items evicted from the cache memory. M is a configurable parameter, e.g., per node, per group of nodes of for the entire system.

The total size of the cache memory. A large cache will typically receive a high cache-quality index, and vice versa.

The size of the remaining free memory in the cache memory. A large free space will typically increase the cache-quality index, and vice versa.

The extent to which the node is busy or idle, for example in handling the cache (e.g., the amount of available bandwidth that the node has for accessing the cache), and/or in performing other tasks.

A busy node will typically receive a lower cache-quality index, and vice versa.

Further additionally or alternatively, any other suitable property of the cache memory and/or of the cached data items can be used in the evaluation of the cache-quality index.

The description that follows illustrates three processes that are carried out by cache-management modules 52, in accordance with embodiments of the present invention. The left-hand-side of FIG. 2 shows a process of caching a data item, the center of the figure shows a process of retrieving a cached data item, and the right-hand-side of the figure shows a process of evicting a data item from the cache.

The caching process (left-hand-side of FIG. 2) begins with a cache-management module 52 on a certain node 24 identifying that a data item is to be cached, at a caching checking step 64. The node in question is referred to as the "originating node." At a natural-caching node identification step 68, module 52 in the originating node identifies the natural-caching node in which the data item is to be cached by default. Module 52 of the originating node typically identifies the natural-caching node by applying a hashing function to the data item (e.g., to the address of the data item or to other suitable attribute), as explained above.

Module 52 of the originating node sends the data item to module 52 of the natural-caching node, and module 52 of the natural-caching node caches the data item in its local cache 48, at a temporary caching step 72. This temporary caching in the natural-caching node is optional, and may be omitted in some embodiments.

At an alternative node identification step 76, module 52 of the natural-caching node attempts to identify a better node for caching the data item. In evaluating a certain alternative node, module 52 of the natural-caching node typically considers (i) the cache-quality index published by the alternative node, and (ii) the performance penalty (e.g., added latency) incurred by caching the data item in the alternative node. The performance penalty may pertain to sending the data item to the alternative node, and/or to later accessing the data item in the cache of the alternative node.

For example, module 52 of the natural-caching node may also consider factors such as the latency or topological distance (number of network hops) between the alternative node and the source of the data item. For making these considerations, module 52 of the natural-caching node may take into account knowledge regarding the topology of network 28. The evaluation of step 76 is typically repeated for multiple alternative nodes, or even for all nodes other than the natural-caching node.

Module 52 of the natural-caching node checks whether an alternative node that provides better caching performance is found, at an alternative node checking step 80. If so, module 52 of the natural-caching node sends the data item to module 52 of the alternative node, at a moving step 84.

Module 52 of the alternative node caches the data item in its local cache 48. Module 52 of the natural-caching node removes the data item from its local cache 48, but records the identity of the alternative node to which the data item was sent. This record will be used later for retrieving the data item.

The retrieval process (middle of FIG. 2) begins with a cache-management module 52 on a certain node 24 identifying that a data item is to be read, at a readout checking step 88. The node in question is referred to as the "requesting node."

Module 52 of the requesting node identifies the natural-caching node of the requested data item, by applying the hash function, at a natural-caching node identification step 92. Module 52 of the requesting node then requests the data item from module 52 of the natural-caching node, at a requesting step 96.

At a response step 100, module 52 of the natural-caching node responds by returning the requested data item (if the data item is indeed cached in the natural-caching node) or by returning the identity of the alternative node (if the data item was send to an alternative node). If none of these conditions is met, module 52 of the natural-caching node responds with a "not cached" response, indicating that the data item is not cached anywhere in system 20.

If the data item itself was returned, module 52 of the requesting node serves the data item to the requesting workload. If the identity of the alternative node was returned, module 52 of the requesting node obtains the data item from module 52 of the alternative node, and then serves the data item to the requesting workload.

In some embodiments, the requesting node may cache the actual address in which the data item is stored (typically only the address, not the data item itself). When the same data item is requested again, the requesting node may use the cached address and thus reduce the cost of repeated access.

The eviction process (right-hand-side of FIG. 2) begins with a cache-management module 52 on a certain node 24 identifying that a data item is to be evicted from cache memory 48, at an eviction checking step 104. The node in question is referred to as the "evicting node." The decision to evict a data item may depend on various policies (e.g., Least-Recently Used—LRU), and/or on the cache-quality indices of the various data items cached in cache 48. At an eviction step 108, module 52 of the evicting node evicts the data item from cache 48.

At a notification checking step 112, module 52 of the evicting node checks whether the data item "belongs" to a different natural-caching node. In other words, module 52 of the evicting node checks whether the evicting node served as the natural-caching node of the data item, or as an alternative node. If the evicting node was not the natural-caching node of the data item, module 52 of the evicting node notifies module 52 of the natural-caching node that the data item was evicted, at an eviction notification step 116. In response, module 52 of the natural-caching node deletes the identity of the alternative node with respect to this data item. As a result, module 52 of the natural-caching node will respond to subsequent requests for this data item with a "not cached" response.

In some embodiments, modules 52 cache multiple copies of a given data item in different cache memories 48. Caching multiple copies is useful, for example, for handling scenarios in which multiple nodes request the same data item simultaneously. Modules 52 may choose the nodes in which to cache multiple copies of a data item based on various criteria, e.g., in proximity to the expected requesting nodes, or in the same nodes that also store the data item in persistent storage devices 44.

In some embodiments, the natural caching node of a data item is selected to be the node having the persistent storage device on which the data item is stored. In this manner, if the natural caching node does not have the item in its local cache, it may read the data item locally from storage and serve it (and possibly also cache it in the cache).

The method flows shown in FIG. 2 above are example flows that are depicted purely for the sake of conceptual clarity. In alternative embodiments, the disclosed technique can be carried out using any other suitable flow. For example, in some embodiments nodes 24 carry out rebalancing, or load balancing, of their cache memories 48. Unlike the flow on the left-hand-side of FIG. 2, this rebalancing process is typically not triggered by addition of a new data item to be cached. For example, module 52 of a certain node 24 (e.g., a highly busy node) may transfer one or more data items from its local cache 48 to the cache of another node (e.g., a less busy node). The busy node may select the alternative node and transfer the data items, for example, using steps 76-84 of FIG. 2 above. This sort of rebalancing process may be repeated asynchronously as a background process.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computing system, comprising multiple compute nodes that comprise respective processors and respective cache memories, wherein the processors are configured to:
   pre-assign a default compute node for future caching of a given data item, based on an attribute of the given data item;
   subsequently, when the given data item is to be cached, check whether an alternative compute node is more suitable for caching the given data item than the pre-assigned default compute node, depending on cache-quality metrics that are evaluated for respective cache memories of the compute nodes;
   when, based on the cache-quality metrics, the alternative compute node is more suitable than the pre-assigned default compute node for caching the given data item, cache the given data item in the alternative compute node; and
   when, based on the cache-quality metrics, the alternative compute node is not more suitable than the pre-assigned default compute node for caching the given data item, cache the given data item in the pre-assigned default compute node.

2. The computing system according to claim 1, wherein the processors are configured to check whether the alternative compute node is more suitable by evaluating a criterion that depends on (i) the cache-quality metrics and (ii) one or more estimated latencies incurred by caching the given data item in one or more respective compute nodes.

3. The computing system according to claim 1, wherein the processors are configured to check whether the alternative compute node is more suitable by evaluating a criterion that depends on a topology of a network that interconnects the compute nodes.

4. The computing system according to claim 1, wherein the processors are configured to check whether the alternative compute node is more suitable by evaluating a criterion that depends on an importance measure of the given data item.

5. The computing system according to claim 1, wherein a cache-quality metric of a cache memory of a compute node depends on one or more of:
   respective ages of one or more data items cached in the cache memory;
   respective importance levels of one or more data items cached in the cache memory;
   respective frequencies with which one or more cached data items are accessed;
   respective weighted costs of eviction for one or more data items most-recently evicted from the cache memory;
   respective quality levels of the one or more data items most-recently evicted from the cache memory;
   respective weighted eviction costs for one or more lowest-quality data items evicted from the cache memory;
   a total size of the cache memory;
   a size of remaining free memory in the cache memory; and
   an extent to which the compute node is busy.

6. The computing system according to claim 1, wherein, when the alternative compute node is more suitable, a processor of the default compute node is configured to record an identity of the alternative compute node.

7. The computing system according to claim 6, wherein a processor of a compute node is configured to read the given data item by requesting the given data item from the default compute node, and in response receiving either the given data item or the identity of the alternative compute node in which the given data item is actually cached.

8. The computing system according to claim 6, wherein, in response to eviction of the given data item from the cache memory of the alternative compute node, a processor of the default compute node is configured to delete the identifier of the alternative compute node.

9. The computing system according to claim 1, wherein the processors are configured to initially cache the given data item in the default compute node, and, when the alternative compute node is more suitable, to send the given data item to the alternative compute node.

10. A method for data storage, comprising:
in a computing system that comprises multiple compute nodes, pre-assigning a default compute node for future caching of a given data item, based on an attribute of the given data item;
subsequently, when the given data item is to be cached, checking whether an alternative compute node is more suitable for caching the given data item than the pre-assigned default compute node, depending on cache-quality metrics that are evaluated for respective cache memories of the compute nodes;
when, based on the cache-quality metrics, the alternative compute node is more suitable than the pre-assigned default compute node for caching the given data item, caching the given data item in the alternative compute node; and
when, based on the cache-quality metrics, the alternative compute node is not more suitable than the pre-assigned default compute node for caching the given data item, caching the given data item in the pre-assigned default compute node.

11. The method according to claim 10, wherein checking whether the alternative compute node is more suitable comprises evaluating a criterion that depends on (i) the cache-quality metrics and (ii) one or more estimated latencies incurred by caching the given data item in one or more respective compute nodes.

12. The method according to claim 10, wherein checking whether the alternative compute node is more suitable comprises evaluating a criterion that depends on a topology of a network that interconnects the compute nodes.

13. The method according to claim 10, wherein checking whether the alternative compute node is more suitable comprises evaluating a criterion that depends on an importance measure of the given data item.

14. The method according to claim 10, wherein a cache-quality metric of a cache memory of a compute node depends on one or more of:
respective ages of one or more data items cached in the cache memory;
respective importance levels of one or more data items cached in the cache memory;
respective frequencies with which one or more cached data items are accessed;
respective weighted costs of eviction for one or more data items most-recently evicted from the cache memory;
respective quality levels of the one or more data items most-recently evicted from the cache memory;
respective weighted eviction costs for one or more lowest-quality data items evicted from the cache memory;
a total size of the cache memory;
a size of remaining free memory in the cache memory; and
an extent to which the compute node is busy.

15. The method according to claim 10, and comprising, when the alternative compute node is more suitable, recording an identity of the alternative compute node in the default compute node.

16. The method according to claim 15, and comprising reading the given data item by requesting the given data item from the default compute node, and in response receiving either the given data item or the identity of the alternative compute node in which the given data item is actually cached.

17. The method according to claim 15, and comprising, upon evicting the given data item from the cache memory of the alternative compute node, deleting the identifier of the alternative compute node from the default compute node.

18. The method according to claim 10, wherein caching the given data item comprises initially caching the given data item in the default compute node, and, when the alternative compute node is more suitable, sending the given data item to the alternative compute node.

19. A compute node, comprising:
a network interface, for communicating over a network with one or more other compute nodes; and
a processor, configured:
to pre-assign a default compute node for future caching of a given data item, based on an attribute of the given data item,
subsequently, when the given data item is to be cached, to check whether an alternative compute node is more suitable for caching the given data item than the pre-assigned default compute node, depending on cache-quality metrics that are evaluated for respective cache memories of the compute nodes,
when, based on the cache-quality metrics, the alternative compute node is more suitable than the pre-assigned default compute node for caching the given data item, to cache the given data item in the alternative compute node, and
when, based on the cache-quality metrics, the alternative compute node is not more suitable than the pre-assigned default compute node for caching the given data item, to cache the given data item in the pre-assigned default compute node.

20. A computer software product, the product comprising a tangible non-transitory computer-readable medium in which program instructions are stored, which instructions, when read by a processor of a compute node that is connected by a network to one or more other compute nodes, causes the processor:
to pre-assign a default compute node for future caching of a given data item, based on an attribute of the given data item,
subsequently, when the given data item is to be cached, to check whether an alternative compute node is more suitable for caching the given data item than the pre-assigned default compute node, depending on cache-quality metrics that are evaluated for respective cache memories of the compute nodes,
when, based on the cache-quality metrics, the alternative compute node is more suitable than the pre-assigned default compute node for caching the given data item, to cache the given data item in the alternative compute node, and when, based on the cache-quality metrics, the alternative compute node is not more suitable than the pre-assigned default compute node for caching the given data item, to cache the given data item in the pre-assigned default compute node.

* * * * *